(12) United States Patent
Nicou et al.

(10) Patent No.: US 12,544,322 B2
(45) Date of Patent: Feb. 10, 2026

(54) DYEING COMPOSITION COMPRISING AN ANTHRAQUINONE CATIONIC DIRECT DYE, A POLYOL, AN ANIONIC SURFACTANT AND A NONIONIC POLYSACCHARIDE

(71) Applicant: L'Oreal, Paris (FR)

(72) Inventors: Valérie Nicou, Saint-Ouen (FR); Samira Rharbi, Saint-Ouen (FR); Julie Blanc, Saint-Ouen (FR)

(73) Assignee: L'Oréal, Paris (FR)

( * ) Notice: Subject to any disclaimer, the term of this patent is extended or adjusted under 35 U.S.C. 154(b) by 392 days.

(21) Appl. No.: 18/013,677

(22) PCT Filed: Jun. 29, 2021

(86) PCT No.: PCT/EP2021/067820
§ 371 (c)(1),
(2) Date: Dec. 29, 2022

(87) PCT Pub. No.: WO2022/002920
PCT Pub. Date: Jan. 6, 2022

(65) Prior Publication Data
US 2023/0363994 A1 Nov. 16, 2023

(30) Foreign Application Priority Data
Jun. 30, 2020 (FR) .................................... 2006858

(51) Int. Cl.
A61Q 5/10 (2006.01)
A61K 8/34 (2006.01)
A61K 8/36 (2006.01)
A61K 8/41 (2006.01)
A61K 8/73 (2006.01)
A61Q 5/06 (2006.01)

(52) U.S. Cl.
CPC .............. *A61K 8/345* (2013.01); *A61K 8/361* (2013.01); *A61K 8/411* (2013.01); *A61K 8/731* (2013.01); *A61Q 5/065* (2013.01); *A61K 2800/4322* (2013.01); *A61K 2800/5422* (2013.01)

(58) Field of Classification Search
CPC ........ A61K 8/345; A61K 8/361; A61K 8/411; A61K 8/731; A61K 2800/4322; A61K 2800/5422; A61K 8/41; A61K 8/355; A61Q 5/065
USPC ........................................................... 8/405
See application file for complete search history.

(56) References Cited

U.S. PATENT DOCUMENTS

| 4,137,180 | A | 1/1979 | Naik et al. | |
|---|---|---|---|---|
| 4,874,554 | A | 10/1989 | Lange et al. | |
| 4,957,732 | A | 9/1990 | Grollier et al. | |
| 6,437,149 | B1 | 8/2002 | Genet et al. | |
| 10,667,999 | B2 | 6/2020 | Grosjacques et al. | |
| 2008/0313820 | A1* | 12/2008 | Huet ........................ | A61K 8/73 8/429 |
| 2015/0257995 | A1* | 9/2015 | Goutsis .................. | A61K 8/355 8/405 |
| 2017/0273883 | A1 | 9/2017 | Marsh et al. | |
| 2019/0038534 | A1 | 2/2019 | Consoli et al. | |

FOREIGN PATENT DOCUMENTS

| CA | 2613049 A1 * | 4/2008 | ............. A61Q 5/10 |
|---|---|---|---|
| DE | 102012221987 A1 | 6/2014 | |
| EP | 0186507 A2 | 7/1986 | |
| EP | 0342834 A2 | 11/1989 | |
| EP | 2468248 A1 * | 6/2012 | ............. A61Q 5/10 |
| EP | 2658511 B1 * | 4/2018 | ............. A61Q 5/10 |
| FR | 2786484 A1 | 6/2000 | |
| FR | 2883746 A1 | 10/2006 | |
| WO | 2014082948 A2 | 6/2014 | |
| WO | WO 2014202152 A1 * | 12/2014 | ............ A61Q 5/065 |
| WO | 2022/002920 A1 | 1/2022 | |
| WO | 2022/002923 A1 | 1/2022 | |

OTHER PUBLICATIONS

Non-Final Office Action in U.S. Appl. No. 18/013,790, mailed Apr. 30, 2024, 6 pages.
Scientific and Technical Information Center (STIC) Search Report, dated Apr. 4, 2024, 435 pages.
International Search Report and Written Opinion for counterpart Application No. PCT/EP2021/067820, dated Sep. 20, 2021.
International Search Report and Written Opinion for counterpart Application No. PCT/EP2021/067825, dated Sep. 20, 2021.
Todd, Charles, et al., "Volatile Silicone Fluids for Cosmetic Formulations," Cosmetics and Toiletries, vol. 91, Jan. 1976, pp. 29-32.
Mintel: "Color Lustre," Shu Uemura Art of Hair, Record No. 1945697, XP055559785, Dec. 21, 2012.
Mintel: "Coloring Treatment," L'Oreal, Record No. 2890731, XP055559780, Jan. 12, 2015.

* cited by examiner

*Primary Examiner* — Eisa B Elhilo
(74) *Attorney, Agent, or Firm* — The Marbury Law Group, PLLC

(57) ABSTRACT

The invention relates to a composition for dyeing human keratin fibers, preferably the hair, comprising:—one or more anthraquinone cationic direct dyes,—one or more polyols,—one or more anionic surfactants, and—one or more nonionic polysaccharides.

20 Claims, No Drawings

DYEING COMPOSITION COMPRISING AN ANTHRAQUINONE CATIONIC DIRECT DYE, A POLYOL, AN ANIONIC SURFACTANT AND A NONIONIC POLYSACCHARIDE

CROSS REFERENCE TO RELATED APPLICATIONS

This is a National Stage Application of PCT/EP2021/067820, filed internationally on Jun. 29, 2021, which claims priority to French Application No. 2006858, filed on Jun. 30, 2020, the contents of both of which are incorporated by reference herein in their entireties.

One subject of the present invention is a composition for dyeing human keratin fibers, especially the hair, comprising at least one anthraquinone cationic direct dye, at least one polyol, at least one anionic surfactant and at least one nonionic polysaccharide. The invention also relates to a dyeing process using this composition.

Many people have sought for a long time to modify the color of their hair and in particular to mask their gray hair.

It is known practice to dye keratin fibers with dyeing compositions containing direct dyes. These compounds are colored and coloring molecules that have affinity for the fibers. It is known practice, for example, to use direct dyes of the nitrobenzene type, anthraquinone or nitropyridine dyes, and dyes of the azo, xanthene, acridine, azine or triarylmethane type.

These dyes are usually applied to fibers optionally in the presence of an oxidizing agent if it is desired to obtain simultaneous lightening of the fibers. Once the leave-on time has elapsed, the fibers are rinsed, optionally washed and dried.

The colorings resulting from the use of direct dyes are colorings that are often chromatic but are, however, only temporary or semi-permanent since the nature of the interactions that bind the direct dyes to the keratin fiber and their desorption from the surface and/or the core of the fiber are responsible for their weak dyeing power and their poor relative persistence with respect to washing or perspiration. Thus, the colorings may also not be sufficiently persistent in the face of external agents such as light, shampoos and perspiration.

It is also difficult to obtain powerful and/or persistent colorings for certain shades, especially blue shades, in particular at alkaline pH values.

Furthermore, consumers are still in search of dye compositions that exhibit optimum usage qualities.

The objective of the present invention is to provide a dyeing composition which results in good dyeing properties and which exhibits improved usage qualities.

In particular, one of the objectives of the present invention is to provide direct dyeing compositions that make it possible to obtain a coloring with varied shades, especially shades that are natural, powerful, sparingly selective and that show good resistance to the various attacks to which the hair may be subjected, in particular shampoo washes.

Another objective of the present invention is to provide direct dyeing compositions which exhibit optimum usage qualities, and in particular which are applied easily and which are rinsed rapidly.

This objective is achieved by the present invention, one subject of which is especially a composition for dyeing keratin fibers such as the hair, comprising:
one or more anthraquinone cationic direct dyes;
one or more polyols,
one or more anionic surfactants, and
one or more nonionic polysaccharides.

By formulating these direct dyes of anthraquinone structure in this specific support, it is possible to obtain a composition that is easy to apply to the hair, without running, while having good dyeing properties. The composition obtained also makes it possible to obtain natural shades and a coloring that bleeds little, in particular after the final shampoo wash. They may therefore be rinsed rapidly, without using a large amount of water.

Another subject of the invention is a process for dyeing human keratin fibers, preferably the hair, characterized in that the composition is applied to the keratin fibers.

Other subjects, features, aspects and advantages of the invention will emerge even more clearly on reading the description and the examples that follow.

In the text hereinbelow, unless otherwise indicated, the limits of a range of values are included in that range, notably in the expressions "between" and "ranging from . . . to . . . ".

Moreover, the expression "at least one" used in the present description is equivalent to the expression "one or more".

Anthraquinone Cationic Direct Dye(s)

The composition according to the invention comprises at least one anthraquinone cationic direct dye.

A "cationic direct dye" is understood to mean any dye other than oxidation dyes, commonly referred to as "basic" direct dyes or "basic dyes". They are referred to as "basic" by virtue of their affinity for acidic substances, notably including at least one cationic or cationizable endocyclic or exocyclic group within their structure.

Preferably, the anthraquinone cationic direct dye(s) is (are) synthetic, namely obtained solely by chemical synthesis and is (are) not naturally occurring. In particular, it is a dye which is not obtained from a plant matrix or by fermentation and which diffuses superficially on the fiber.

The anthraquinone cationic direct dye(s) that may be used in the composition according to the invention comprise a quaternary ammonium group.

These cationic radicals are, for example, a cationic radical:
bearing a $(C_1-C_8)$alkylammonium exocyclic charge, or
bearing an endocyclic charge, such as comprising a cationic heteroaryl group chosen from: acridinium, benzimidazolium, benzobistriazolium, benzopyrazolium, benzopyridazinium, benzoquinolium, benzothiazolium, benzotriazolium, benzoxazolium, bipyridinium, bistetrazolium, dihydrothiazolium, imidazopyridinium, imidazolium, indolium, isoquinolium, naphthoimidazolium, naphthoxazolium, naphthopyrazolium, oxadiazolium, oxazolium, oxazolopyridinium, oxonium, phenazinium, phenooxazolium, pyrazinium, pyrazolium, pyrazoyltriazolium, pyridinium, pyridinoimidazolium, pyrrolium, pyrylium, quinolium, tetrazolium, thiadiazolium, thiazolium, thiazolopyridinium, thiazoylimidazolium, thiopyrylium, triazolium or xanthylium.

Preferably, the cationic charge is exocyclic.

Among the anthraquinone cationic direct dyes, those of formulae (I) bearing an exocyclic cationic charge are preferred:

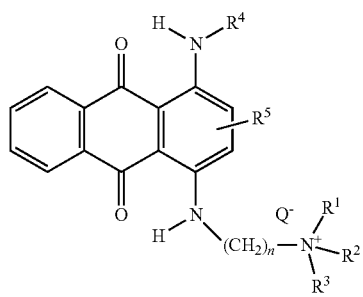

(I)

wherein:
R$^1$, R$^2$ and R$^3$, which may be identical or different, representing a hydrogen atom or an optionally substituted (C$_1$-C$_8$)alkyl group;
R$^4$ representing a hydrogen atom or an optionally substituted (C$_1$-C$_8$)alkyl group;
R$^5$ representing a hydrogen atom, an optionally substituted (C$_1$-C$_8$)alkyl group, an optionally substituted (C$_1$-C$_8$)alkylene group, a halogen, a hydroxyl group or a (C$_1$-C$_8$)alkoxy group;
n representing a number between 1 and 8;
Q$^-$ represents an organic or mineral anionic counterion, such as a halide or an alkyl sulfate.

Preferably, in formula (I):
R$^1$, R$^2$ and R$^3$, which may be identical or different, representing an optionally substituted (C$_1$-C$_6$)alkyl group;
R$^4$ representing a hydrogen atom or optionally substituted (C$_1$-C$_6$)alkyl group;
R$^5$ representing a hydrogen atom or an optionally substituted (C$_1$-C$_8$)alkyl group;
n representing a number between 1 and 6;
Q$^-$ representing a halide or an alkyl sulfate.

More preferentially, in formula (I):
R$^1$, R$^2$ and R$^3$, which may be identical or different, representing an optionally substituted (C$_1$-C$_3$)alkyl group;
R$^4$ representing a hydrogen atom or a methyl, preferably a methyl;
R$^5$ representing a hydrogen atom or a methyl, preferably a hydrogen atom;
n representing a number between 2 and 4;
Q$^-$ representing a halide or an alkyl sulfate, preferably a halide.

Among the dyes of formula (I), use may in particular be made of the dyes of formula (I') or of formula (I") below:

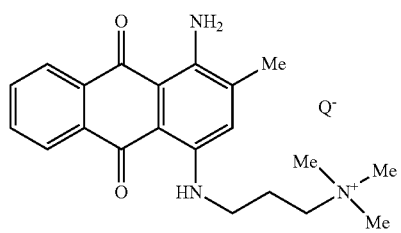

(I')

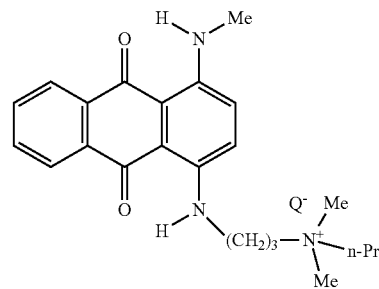

(I")

with Q$^-$ being an anionic counterion, particularly a halide such as bromide or chloride, or an alkyl sulfate, such as methyl sulfate or mesityl. Preferably, Q$^-$ is a halide, better still a bromide.

The term "anionic counterion" is intended to mean an anion or an anionic group derived from an organic or mineral acid salt which counterbalances the cationic charge of the dye; more particularly, the anionic counterion is chosen from: i) halides such as chloride or bromide; ii) nitrates; iii) sulfonates, including C$_1$-C$_6$ alkylsulfonates: Alk-S(O)$_2$O$^-$ such as methanesulfonate or mesylate, and ethanesulfonate; iv) arylsulfonates: Ar—S(O)$_2$O$^-$ such as benzenesulfonate and toluenesulfonate or tosylate; v) citrate; vi) succinate; vii) tartrate; viii) lactate; ix) alkyl sulfates: Alk-O—S(O)O$^-$ such as methyl sulfate and ethyl sulfate; x) aryl sulfates: Ar—O—S(O)O$^-$, such as benzene sulfate and toluene sulfate; xi) alkoxy sulfates: Alk-O—S(O)$_2$O$^-$ such as methoxy sulfate and ethoxy sulfate; xii) aryloxy sulfates: Ar—O—S(O)$_2$O—; xiii) phosphates O═P(OH)$_2$—O$^-$, O═P(O$^-$)$_2$—OH, O═P(O$^-$)$_3$, HO—[P(O)(O$^-$)]$_w$—P(O)(O$^-$)$_2$ with w being an integer; xiv) acetate; xv) triflate; and xvi) borates such as tetrafluoroborate; xvii) disulfate (O═)$_2$S(O$^-$)$_2$ or SO$_4^{2-}$ and monosulfate HSO$_4^-$.

One particularly preferred dye of formula (I') is HC Blue 17.

One particularly preferred dye of formula (I") is HC Blue 16 (1-methylamino-4-(3'-dimethylpropylammoniumpropylamino)antraquinone bromide).

Preferably, the anthraquinone cationic direct dye(s) of formula (I) is (are) chosen from the dyes of formula (I') and (I") and mixtures thereof, and preferentially from the dyes of formula (I").

Preferably, the anthraquinone cationic direct dye(s) of formula (I) is (are) chosen from HC Blue 16, HC Blue 17, or mixtures thereof, more preferentially HC Blue 16.

According to one embodiment, the anthraquinone cationic direct dyes are chosen from the dyes of formula (II)

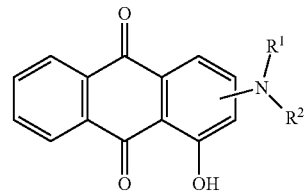

(II)

wherein:
R$^1$ and R$^2$, which may be identical or different, representing a hydrogen atom, an optionally substituted ($C_1$-$C_8$)alkyl group; an optionally substituted ($C_1$-$C_8$)alkylene group, a halogen, a hydroxyl group or a ($C_1$-$C_8$)alkoxy group.

Preferably, in formula (II):
$R^1$ representing a hydrogen atom;
$R^2$ representing a ($C_1$-$C_6$)alkyl group substituted with a 5-, 6- or 7-membered heterocycle comprising at least one nitrogen atom, oxygen atom or sulfur atom.

More preferentially, in formula (II):
$R^1$ representing a hydrogen atom;
$R^2$ representing a ($C_1$-$C_6$)alkyl group substituted with a morpholinyl or alkylmorpholinyl group.

More preferentially, use will be made of the dyes of formula (II') below:

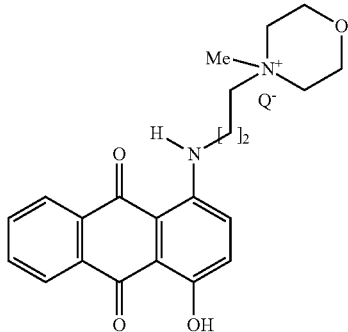

(II')

with $Q^-$ being an anionic counterion as defined previously, particularly a halide, such as bromide or chloride, or an alkyl sulfate, such as methyl sulfate or mesityl. Preferably, $Q^-$ is an alkyl sulfate, better still methyl sulfate.

The dye corresponding to formula (II') is preferably 1-(N-methylmorpholiniumpropylamino)-4-hydroxyanthraquinone methyl sulfate.

Preferentially, the anthraquinone cationic direct dye(s) is (are) chosen from the dyes of formula (I') and (I"), and more preferentially from the dyes of formula (I"), better still from HC Blue 16.

According to a preferred embodiment, the total amount of anthraquinone cationic direct dye(s) ranges from 0.01% to 15% by weight, preferably from 0.05% to 10% by weight, more preferentially from 0.1% to 5% by weight, better still from 0.3% to 3% relative to the total weight of the composition.

According to a preferred embodiment, the total amount of anthraquinone cationic direct dye(s) of formula (I) ranges from 0.01% to 15% by weight, preferably from 0.05% to 10% by weight, more preferentially from 0.1% to 5% by weight, better still from 0.3% to 3% relative to the total weight of the composition.

According to a preferred embodiment, the total amount of anthraquinone cationic direct dye(s) of formula (I") ranges from 0.01% to 15% by weight, preferably from 0.05% to 10% by weight, more preferentially from 0.1% to 5% by weight, better still from 0.3% to 3% relative to the total weight of the composition.

Polyol

For the purposes of the present invention, the term "polyol" means an organic compound constituted of a hydrocarbon-based chain optionally interrupted with one or more oxygen atoms and bearing at least two free hydroxyl groups (—OH) borne by different carbon atoms, this compound possibly being cyclic or acyclic, linear or branched, and saturated or unsaturated.

More particularly, the polyol(s) that may be used according to the invention comprise from 2 to 30 hydroxyl groups, more preferentially from 2 to 10 hydroxyl groups and even more preferentially from 2 to 3 hydroxyl groups.

The polyol(s) that may be used according to the invention generally comprise at least two carbon atoms.

Preferably, said polyol(s) that may be used according to the invention are chosen from polyols comprising at least three carbon atoms, and are preferably chosen from propylene glycol, 1,3-propanediol, 1,3-butylene glycol, 1,2-pentanediol, dipropylene glycol, hexylene glycol, pentylene glycol, glycerol and ethylene glycol, and a mixture of these compounds.

Very particularly preferably, said polyol(s) that may be used according to the invention are chosen from propylene glycol, hexylene glycol, glycerol and a mixture of these compounds.

Preferably, the polyol(s) are present in the composition in a total content ranging from 0.1% to 20% by weight, preferably from 0.5% to 15% by weight, more preferentially from 1% to 10% by weight, and better still from 2% to 8% by weight, relative to the total weight of the composition.

Anionic Surfactant

The term "anionic surfactant" means a surfactant including, as ionic or ionizable groups, only anionic groups.

In the present description, an entity is described as being "anionic" when it possesses at least one permanent negative charge or when it can be ionized to give a negatively charged entity, under the conditions of use of the composition of the invention (medium or pH, for example) and not comprising a cationic charge.

The anionic surfactants can be chosen from sulfate, sulfonate and carboxylic (or carboxylate) surfactants. Very obviously, a mixture of these surfactants can be employed.

It is understood, in the present description, that:
the carboxylate anionic surfactants comprise at least one carboxylic or carboxylate function (—COOH or —COO$^-$) and may optionally also comprise one or more sulfate and/or sulfonate functions;
the sulfonate anionic surfactants comprise at least one sulfonate function (—SO$_3$H or —SO$_3^-$) and may optionally also comprise one or more sulfate functions, but do not comprise any carboxylate functions; and
the sulfate anionic surfactants comprise at least one sulfate function but do not comprise a carboxylate or sulfonate function.

The carboxylic anionic surfactants that may be used thus include at least one carboxylic or carboxylate function (—COOH or —COO$^-$).

They may be chosen from the following compounds: fatty acids, acylglycinates, acyllactylates, acylsarcosinates, acylglutamates; alkyl-D-galactosideuronic acids, alkyl ether carboxylic acids, alkyl($C_6$-$C_{30}$ aryl) ether carboxylic acids, alkylamido ether carboxylic acids; and also the salts of these compounds; and mixtures thereof;
the alkyl and/or acyl groups of these compounds comprise from 6 to 30 carbon atoms, in particular from 12 to 28, better still from 14 to 24, indeed even from 16 to 22, carbon atoms; the aryl group preferably denoting a phenyl or benzyl group;

it being possible for these compounds to be polyoxyalkylenated, in particular polyoxyethylenated, and then preferably comprising from 1 to 50 ethylene oxide units, better still from 2 to 10 ethylene oxide units.

Use may also be made of $C_6$-$C_{24}$ alkyl monoesters of polyglycoside-polycarboxylic acids such as $C_6$-$C_{24}$ alkyl polyglycoside-citrates, $C_6$-$C_{24}$ alkyl polyglycoside-tartrates and $C_6$-$C_{24}$ alkyl polyglycoside-sulfosuccinates, and salts thereof.

Preferentially, the carboxylate anionic surfactants are chosen, alone or as a mixture, from:
fatty acids;
acylglutamates, notably $C_6$-$C_{24}$, indeed even $C_{12}$-$C_{20}$, acylglutamates, such as stearoylglutamates, and in particular disodium stearoylglutamate;
acylsarcosinates, notably $C_6$-$C_{24}$, indeed even $C_{12}$-$C_{20}$, acylsarcosinates, such as palmitoylsarcosinates, and in particular sodium palmitoylsarcosinate;
acyllactylates, notably $C_{12}$-$C_{28}$, indeed even $C_{14}$-$C_{24}$, acyllactylates, such as behenoyllactylates, and in particular sodium behenoyllactylate;
$C_6$-$C_{24}$, in particular $C_{12}$-$C_{20}$, acylglycinates;
($C_6$-$C_{24}$)alkyl ether carboxylates, and in particular ($C_{12}$-$C_{20}$)alkyl ether carboxylates;
polyoxyalkylenated ($C_6$-$C_{24}$)alkyl(amido) ether carboxylic acids, in particular those comprising from 2 to 50 ethylene oxide groups;
in particular in the form of alkali metal or alkaline-earth metal, ammonium or amino alcohol salts.

Mention may very particularly be made, among the above carboxylic surfactants, of surfactants of fatty acid type, in particular $C_6$-$C_{30}$, preferably $C_8$-$C_{24}$, preferentially $C_{10}$-$C_{22}$ fatty acid type. These surfactants are preferably chosen from the compounds of formula (a) below:

R—C(O)—OX (a), with
X denoting a hydrogen atom, an ammonium ion, an ion derived from an alkali metal or an alkaline-earth metal or an ion derived from an organic amine, preferably a hydrogen atom, and
R denoting a saturated or unsaturated and linear or branched alkyl group of 7 to 29 carbon atoms.
R preferably denotes a saturated or unsaturated and linear or branched alkyl group of 7 to 23 carbon atoms, preferably of 11 to 21 carbon atoms.

Mention may be made, among the fatty acids, of lauric acid, palmitic acid, myristic acid, stearic acid, oleic acid or behenic acid.

The fatty acids are advantageously chosen from lauric acid, myristic acid, oleic acid and mixtures thereof. Preferably, the fatty acid is lauric acid.

Mention may very particularly be made, among the above carboxylic surfactants, of surfactants of sarcosinate type, in particular chosen from ($C_6$-$C_{30}$)acylsarcosinates of formula (III) below:

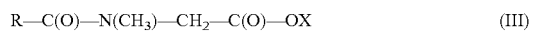

R—C(O)—N(CH$_3$)—CH$_2$—C(O)—OX (III)

with
X denoting a hydrogen atom, an ammonium ion, an ion derived from an alkali metal or an alkaline-earth metal or an ion derived from an organic amine, preferably a hydrogen atom, and
R denoting a linear or branched alkyl group of 6 to 30 carbon atoms.
R preferably denotes a linear or branched alkyl group of 8 to 24 carbon atoms, preferably of 12 to 20 carbon atoms.

Mention may be made, among the ($C_6$-$C_{30}$)acylsarcosinates of formula (III) which can be used in the present composition, of palmitoylsarcosinates, stearoylsarcosinates, myristoylsarcosinates, lauroylsarcosinates and cocoylsarcosinates, in acid form or in salified form.

The anionic surfactant(s) of sarcosinate type are advantageously chosen from sodium lauroyl sarcosinate, stearoylsarcosine, myristoylsarcosine, and mixtures thereof, preferably from stearoylsarcosine, myristoylsarcosine, and mixtures thereof.

Among the above carboxylic surfactants, mention may also be made of polyoxyalkylenated alkyl(amido) ether carboxylic acids and salts thereof, in particular those including from 2 to 50 alkylene oxide and in particular ethylene oxide groups, such as the compounds sold by the company Kao under the Akypo names.

The polyoxyalkylenated alkyl(amido) ether carboxylic acids capable of being used are preferably chosen from those of formula (IV):

R$_1$—(OC$_2$H$_4$)n—OCH$_2$COOA (IV)

wherein:
R$_1$ represents a linear or branched $C_6$-$C_{24}$ alkyl or alkenyl radical, a ($C_8$-$C_9$)alkylphenyl radical or an R$_2$CONH—CH$_2$—CH$_2$— radical with R$_2$ denoting a linear or branched $C_9$-$C_{21}$ alkyl or alkenyl radical;
preferably, R$_1$ is a $C_8$-$C_{20}$, preferably $C_8$-$C_{18}$, alkyl radical and aryl preferably denotes phenyl,
n is an integer or decimal number (mean value) ranging from 2 to 24 and preferably from 2 to 10,
A denotes H, ammonium, Na, K, Li, Mg or a monoethanolamine or triethanolamine residue.

Use may also be made of mixtures of compounds of formula (II), in particular of mixtures of compounds having different R$_1$ groups.

The polyoxyalkylenated alkyl(amido) ether carboxylic acids which are particularly preferred are those of formula (II) wherein:
R$_1$ denotes a $C_{12}$-$C_{14}$ alkyl, cocoyl, oleyl, nonylphenyl or octylphenyl radical,
A denotes a hydrogen or sodium atom, and
n ranges from 2 to 20, preferably from 2 to 10.

More preferentially still, use is made of compounds of formula (II) in which R$_1$ denotes a $C_{12}$ alkyl radical, A denotes a hydrogen or sodium atom and n varies from 2 to 10.

The sulfonate anionic surfactants that may be used include at least one sulfonate function (—SO$_3$H or —SO$_3^-$).
They can be chosen from the following compounds: alkylsulfonates, alkylamidesulfonates, alkyl aryl sulfonates, α-olefinsulfonates, paraffinsulfonates, alkyl sulfosuccinates, alkyl ether sulfosuccinates, alkylamide sulfosuccinates, alkyl sulfoacetates, N-acyl taurates, acyl isethionates; alkyl sulfolaurates; and also the salts of these compounds;
the alkyl groups of these compounds comprising from 6 to 30 carbon atoms, in particular from 12 to 28, better still from 14 to 24, indeed even from 16 to 22, carbon atoms; the aryl group preferably denoting a phenyl or benzyl group;
it being possible for these compounds to be polyoxyalkylenated, in particular polyoxyethylenated, and then preferably comprising from 1 to 50 ethylene oxide units, better still from 2 to 10 ethylene oxide units.

Preferentially, the sulfonate anionic surfactants are chosen, alone or as a mixture, from:
$C_6$-$C_{24}$, in particular $C_{12}$-$C_{20}$, alkyl sulfosuccinates, in particular lauryl sulfosuccinates;

$C_6$-$C_{24}$, in particular $C_{12}$-$C_{20}$, alkyl ether sulfosuccinates;
($C_6$-$C_{24}$)acyl isethionates, preferably ($C_{12}$-$C_{18}$)acyl isethionates;
in particular in the form of alkali metal or alkaline-earth metal, ammonium or amino alcohol salts.

The sulfate anionic surfactants that may be used include at least one sulfate function (—$OSO_3H$ or —$OSO_3^-$).

They may be chosen from the following compounds: alkyl sulfates, alkyl ether sulfates, alkylamido ether sulfates, alkylaryl polyether sulfates, monoglyceride sulfates; and the salts of these compounds;
the alkyl groups of these compounds comprising from 6 to 30 carbon atoms, in particular from 12 to 28, better still from 14 to 24, indeed even from 16 to 22, carbon atoms; the aryl group preferably denoting a phenyl or benzyl group;
these compounds being able to be (poly)oxyalkylenated, in particular (poly)oxyethylenated, and then preferably comprising from 1 to 50 ethylene oxide units, better still from 1 to 10 ethylene oxide units.

Preferentially, the sulfate anionic surfactants are chosen, alone or as a mixture, from:
alkyl sulfates, in particular $C_6$-$C_{24}$, indeed even $C_{12}$-$C_{20}$, alkyl sulfates;
alkyl ether sulfates, in particular $C_6$-$C_{24}$, indeed even $C_{12}$-$C_{20}$, alkyl ether sulfates, preferably comprising from 1 to 20 ethylene oxide units;
in particular in the form of alkali metal or alkaline-earth metal, ammonium or amino alcohol salts.

When the anionic surfactant is in salt form, said salt may be chosen from alkali metal salts, such as the sodium or potassium salt, ammonium salts, amine salts and in particular amino alcohol salts, and alkaline-earth metal salts, such as the magnesium salt.

Examples of amino alcohol salts that may be mentioned include monoethanolamine, diethanolamine and triethanolamine salts, monoisopropanolamine, diisopropanolamine or triisopropanolamine salts, 2-amino-2-methyl-1-propanol salts, 2-amino-2-methyl-1,3-propanediol salts and tris(hydroxymethyl)aminomethane salts.

The alkali metal or alkaline earth metal salts and in particular the sodium or magnesium salts are preferably used.

Preferentially, the anionic surfactant(s) are chosen from:
$C_6$-$C_{30}$, in particular $C_8$-$C_{24}$, fatty acids;
$C_6$-$C_{24}$, in particular $C_{12}$-$C_{20}$, alkyl sulfates;
$C_6$-$C_{24}$, in particular $C_{12}$-$C_{20}$, alkyl ether sulfates; preferably comprising from 1 to 20 ethylene oxide units;
$C_6$-$C_{24}$, in particular $C_{12}$-$C_{20}$, alkyl sulfosuccinates; in particular lauryl sulfosuccinates;
$C_6$-$C_{24}$, in particular $C_{12}$-$C_{20}$, alkyl ether sulfosuccinates;
($C_6$-$C_{24}$)acyl isethionates, preferably ($C_{12}$-$C_{18}$)acyl isethionates;
$C_6$-$C_{24}$, in particular $C_{12}$-$C_{20}$, acylsarcosinates; in particular palmitoylsarcosinates, stearoylsarcosinates or myristoylsarcosinates;
($C_6$-$C_{24}$)alkyl ether carboxylates, preferably ($C_{12}$-$C_{20}$) alkyl ether carboxylates;
polyoxyalkylenated ($C_6$-$C_{24}$)alkyl(amido) ether carboxylic acids and salts thereof, in particular those including from 2 to 50 alkylene oxide groups and in particular ethylene oxide groups;
$C_6$-$C_{24}$, in particular $C_{12}$-$C_{20}$, acylglutamates;
$C_6$-$C_{24}$, in particular $C_{12}$-$C_{20}$, acylglycinates;
and also salts thereof, in particular the alkali metal or alkaline-earth metal or zinc, ammonium or amino alcohol salts thereof;
and mixtures thereof.

Advantageously, the anionic surfactant(s) are chosen from carboxylate anionic surfactants, and mixtures thereof.

The anionic surfactant(s) are preferably chosen from $C_6$-$C_{30}$ fatty acids, ($C_6$-$C_{30}$)acylglycinates, ($C_6$-$C_{30}$)acyllactylates, ($C_6$-$C_{30}$)acylsarcosinates, ($C_6$-$C_{30}$)acylglutamates; alkyl-D-galactosideuronic acids, alkyl ether carboxylic acids, alkyl($C_6$-$C_{30}$ aryl) ether carboxylic acids, alkylamido ether carboxylic acids; $C_6$-$C_{24}$ alkyl monoesters of polyglycoside-polycarboxylic acids; and also the salts of these compounds; and mixtures thereof.

The anionic surfactant(s) are advantageously chosen from carboxylic anionic surfactants.

Preferably, the anionic surfactant(s) (is) are chosen from $C_6$-$C_{30}$, preferably $C_8$-$C_{24}$, preferentially $C_{10}$-$C_{22}$, fatty acids and mixtures thereof, more preferably from lauric acid, oleic acid, myristic acid, stearic acid, palmitic acid, salts thereof and mixtures thereof.

Preferentially, the anionic surfactant (s) are chosen from lauric acid, oleic acid, myristic acid, salts thereof and mixtures thereof.

Preferably, the fatty acid is lauric acid.

Advantageously, the total content of the anionic surfactant (s) ranges from 0.05% to 10% by weight, preferably from 0.1% to 5% by weight, preferentially from 0.5% to 3% by weight, relative to the total weight of the composition.

In a preferred embodiment, the total content of the carboxylic anionic surfactant(s) ranges from 0.05% to 10% by weight, preferably from 0.1% to 5% by weight, preferentially from 0.5% to 3% by weight, relative to the total weight of the composition.

In a preferred embodiment, the total content of the $C_6$-$C_{30}$ fatty acid(s) ranges from 0.05% to 10% by weight, preferably from 0.1% to 5% by weight, preferentially from 0.5% to 3% by weight, relative to the total weight of the composition.

Nonionic Polysaccharide

The nonionic polysaccharides according to the invention can be chosen from nonionic microbial gums.

For the purposes of the present invention, "microbial gums" is intended to mean substances synthesized by fermentation of sugars by microorganisms.

The microbial gums may be chosen from scleroglucan gums, pullulan gums, curdlan gums, grifolan gums, lentinan gums, schizophyllan gums, spirulinan gums and krestin gums.

Mention may in particular be made of the scleroglucan gums produced by *Sclerotium rolfsii*, the pullulan gums produced by *Aureobacidium pullulens*, the curdlan gums produced by *Alcaligenes* of *Faecalis myxogenes* type, the grifolan gums produced by *Grifola frondara*, the lentinan gums produced by *Lentinus edodes*, the schizophyllan gums produced by *Schizophyllum commine*, the spirulinan gums produced by *Spirulina sybsyla* and the krestin gums produced by *Coriates versicolor*.

Mention may also be made, as nonionic polysaccharides according to the invention, of those chosen from glucans, modified or unmodified starches (such as those resulting, for example, from cereals, such as wheat, maize or rice, from legumes, such as yellow pea, or from tubers, such as potato or cassava), amylose, amylopectin, glycogen, dextrans, celluloses and derivatives thereof (methylcelluloses, hydroxyalkylcelluloses, ethylhydroxyethylcelluloses, carboxymethylcelluloses), mannans, xylans, lignins, arabans, galactans, galacturonans, chitin, chitosans, glucuronoxylans, arabinoxylans, xyloglucans, glucomannans, pectic acids and pectins, arabinogalactans, carrageenans, agars, gums arabic, gums tragacanth, ghatti gums, karaya gums, locust bean gums, galactomannans, such as guar gums and nonionic derivatives thereof (hydroxypropyl guar), and mixtures thereof.

Guar gums, celluloses and derivatives thereof will preferably be used.

The polysaccharides according to the invention may be modified or unmodified.

The unmodified guar gums are, for example, the products sold under the name Vidogum GH 175 by the company Unipectine and under the names Meypro-Guar 50 and Jaguar C by the company Rhodia Chimie.

The modified nonionic guar gums are in particular modified with C1-C6 hydroxyalkyl groups.

Among the hydroxyalkyl groups, mention may be made, by way of example, of hydroxymethyl, hydroxyethyl, hydroxypropyl and hydroxybutyl groups.

These guar gums are well known from the prior art and may be prepared, for example, by reacting corresponding alkene oxides, for instance, propylene oxides, with the guar gum so as to obtain a guar gum modified with hydroxypropyl groups.

The degree of hydroxyalkylation, which corresponds to the number of alkylene oxide molecules consumed by the number of free hydroxyl functions present on the guar gum, preferably ranges from 0.4 to 1.2.

Such nonionic guar gums optionally modified with hydroxyalkyl groups are sold, for example, under the trade names Jaguar HP8, Jaguar HP60 and Jaguar HP120, Jaguar DC 293 and Jaguar HP 105 by the company Rhodia Chimie or under the name Galactasol 4H4FD2 by the company Aqualon.

Use is made in particular, among the celluloses, of hydroxyethylcelluloses and hydroxypropylcelluloses. Mention may be made of the products sold under the names Klucel E F, Klucel H, Klucel L H F, Klucel M F and Klucel G by Aqualon and Cellosize Polymer PCG-10 by Amerchol.

Preferably, the nonionic polysaccharide(s) used according to the invention are chosen from scleroglucan gums, guar gums, celluloses and derivatives thereof and in particular hydroxyethylcelluloses, more preferentially from celluloses and derivatives thereof, in particular hydroxyethylcelluloses.

Preferentially, the total amount of the nonionic polysaccharide(s) in the composition may range from 0.1% to 10% by weight, preferably from 0.5% to 5% by weight, and in particular from 1% to 3% by weight, relative to the total weight of the composition.

In a preferred embodiment, the total amount of the nonionic polysaccharide(s) chosen from celluloses and derivatives thereof may range from 0.1% to 10% by weight, preferably from 0.5% to 5% by weight, and in particular from 1% to 3% by weight, relative to the total weight of the composition.

Basifying Agents

The composition according to the invention may also comprise one or more basifying agents.

The basifying agent may be inorganic or organic or hybrid.

The inorganic basifying agent(s) is (are) preferably chosen from aqueous ammonia, alkali metal carbonates or bicarbonates, sodium hydroxide and potassium hydroxide, and mixtures thereof.

The organic basifying agent(s) is (are) preferably chosen from organic amines with a pKb at 25° C. of less than 12, preferably less than 10 and even more advantageously less than 6. It should be noted that it is the pKb corresponding to the function which has the highest basicity.

The organic basifying agent(s) is (are) chosen, for example, from alkanolamines, oxyethylenated and/or oxypropylenated ethylenediamines, amino acids and the compounds of formula (A1) below:

(A1)

wherein W is a $C_1$-$C_6$ alkylene residue optionally substituted with a hydroxyl group or a $C_1$-$C_6$ alkyl radical; Rx, Ry, Rz and Rt, which may be identical or different, represent a hydrogen atom or a $C_1$-$C_6$ alkyl, $C_1$-$C_6$ hydroxyalkyl or $C_1$-$C_6$ aminoalkyl radical.

Examples of such amines that may be mentioned include 1,3-diaminopropane, 1,3-diamino-2-propanol, spermine and spermidine.

The term "alkanolamine" is intended to mean an organic amine comprising a primary, secondary or tertiary amine function, and one or more linear or branched $C_1$-$C_8$ alkyl groups bearing one or more hydroxyl radicals.

Alkanolamines such as monoalkanolamines, dialkanolamines or trialkanolamines comprising from one to three identical or different $C_1$-$C_4$ hydroxyalkyl radicals are in particular suitable for performing the invention.

Among compounds of this type, mention may be made of monoethanolamine, diethanolamine, triethanolamine, monoisopropanolamine, diisopropanol-amine, N-dimethylaminoethanolamine, 2-amino-2-methyl-1-propanol, triisopropanolamine, 2-amino-2-methyl-1,3-propanediol, 3-amino-1,2-propanediol, 3-dimethylamino-1,2-propanediol and tris(hydroxymethylamino)methane.

More particularly, the amino acids that may be used are of natural or synthetic origin, in their L, D or racemic form, and include at least one acid function chosen more particularly from carboxylic acid, sulfonic acid, phosphonic acid and phosphoric acid functions. The amino acids may be in neutral or ionic form.

As amino acids that may be used in the present invention, mention may notably be made of aspartic acid, glutamic acid, alanine, arginine, ornithine, citrulline, asparagine, carnitine, cysteine, glutamine, glycine, histidine, lysine, isoleucine, leucine, methionine, N-phenylalanine, proline, serine, taurine, threonine, tryptophan, tyrosine and valine.

Advantageously, the amino acids are basic amino acids comprising an additional amine function optionally included in a ring or in a ureido function.

Such basic amino acids are preferably chosen from those corresponding to formula (A2) below:

(A2)

in which R denotes a group chosen from:

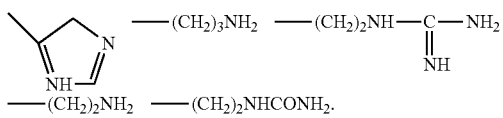
—(CH₂)₂NH₂  —(CH₂)₂NHCONH₂.

The compounds corresponding to formula (A2) are histidine, lysine, arginine, ornithine and citrulline.

The organic amine may also be chosen from organic amines of heterocyclic type. Besides histidine that has already been mentioned in the amino acids, mention may in particular be made of pyridine, piperidine, imidazole, triazole, tetrazole and benzimidazole.

The organic amine may also be chosen from amino acid dipeptides. As amino acid dipeptides that may be used in the present invention, mention may notably be made of carnosine, anserine and balenine.

The organic amine may also be chosen from compounds comprising a guanidine function. As amines of this type that can be used in the present invention, besides arginine, which has already been mentioned as an amino acid, mention may be notably be made of creatine, creatinine, 1,1-dimethylguanidine, 1,1-diethylguanidine, glycocyamine, metformin, agmatine, N-amidinoalanine, 3-guanidinopropionic acid, 4-guanidinobutyric acid and 2-([amino(imino)methyl]amino)ethane-1-sulfonic acid.

Preferably, the organic amine present in the dyeing composition of the invention is an alkanolamine.

More preferentially still, the organic amine is 2-amino-2-methyl-1-propanol.

Hybrid compounds that may be mentioned include the salts of the amines mentioned previously with acids such as carbonic acid or hydrochloric acid.

Guanidine carbonate or monoethanolamine hydrochloride may be used in particular.

Preferably, the composition according to the invention comprises an organic amine, preferably an alkanolamine, and more preferably 2-amino-2-methyl-1-propanol.

Advantageously, the total content of basifying agent(s) ranges from 0.01% to 10% by weight, preferably from 0.05% to 5% by weight and more preferably from 0.1% to 2% relative to the total weight of the composition.

In one preferred embodiment, the total content of organic amine(s) ranges from 0.01% to 10% by weight, preferably from 0.05% to 5% by weight and more preferably from 0.1% to 2% relative to the total weight of the composition.

The composition according to the invention is preferably aqueous. When it is aqueous, the composition according to the invention comprises water in a content preferably ranging from 20% to 98% by weight, better still from 50% to 95% by weight and even better still from 70% to 90% by weight, relative to the total weight thereof.

The pH of the composition is preferably greater than or equal to 7.5. The pH may range from 7.5 to 11, preferably from 8 to 10.5, more preferably from 8.5 to 10 and preferentially from 9 to 10.

Additives

The composition according to the present invention may also optionally comprise one or more additives, different from the compounds of the invention and among which mention may be made of nonionic, cationic or amphoteric surfactants, nonionic polymers other than polysaccharides, cationic, anionic or amphoteric polymers or mixtures thereof, antidandruff agents, anti-seborrheic agents, vitamins and provitamins including panthenol, sunscreens, mineral or organic pigments, sequestrants, plasticizers, solubilizers, acidifying agents, opacifiers or pearlescent agents, antioxidants, hydroxy acids, fragrances, preserving agents and pigments.

Needless to say, a person skilled in the art will take care to select this or these optional additional compounds such that the advantageous properties intrinsically associated with the composition according to the invention are not, or are not substantially, adversely affected by the envisaged addition(s).

The above additives may generally be present in an amount, for each of them, of between 0 and 20% by weight relative to the total weight of the composition.

The following examples serve to illustrate the invention without, however, exhibiting a limiting nature.

EXAMPLES

In the examples that follow, all the amounts are given as weight percentages of active material (AM) relative to the total weight of the composition.

Example 1

Compositions A and B were prepared from ingredients of which the contents are indicated in the table below:

TABLE 1

|  | A Invention | B comparative |
|---|---|---|
| DECETH-5 | 1.8 | 1.8 |
| PROPYLENE GLYCOL | 2 | 2 |
| HEXYLENE GLYCOL | 2.5 | 2.5 |
| PEG-50 HYDROGENATED PALMAMIDE | 3 | 3 |
| GLYCEROL | 2 | 2 |
| AMINOMETHYL PROPANOL | 0.6 | 0.6 |
| LAURIC ACID | 1 | 1 |
| HYDROXYETHYLCELLULOSE | 1.2 | — |
| POLYQUATERNIUM-10 | — | 1.2 |
| HC BLUE NO. 16 | 1 | 1 |
| Water | qs 100 | qs 100 |
| pH | 9.5 ± 0.2 | 9.5 ± 0.2 |

Measurement of the Viscosity of the Compositions

The viscosity is measured by means of a Rheomat RM 180 rheometer (200 rpm, 21.9° C., measurement at 30 s, spindle 2).

The results obtained are as follows (expressed in mPa·s):

TABLE 2

|  | Composition A | Composition B |
|---|---|---|
| Viscosity | 426 mPa · s | 183 mPa · s |

Composition A according to the invention has a higher viscosity than comparative composition B. Thus, composition A according to the invention is easy to use, that is to say easy to apply and to spread on the hair.

Since composition A according to the invention has a thickened texture, unlike comparative composition B which has a fluid texture, it has a lower risk of running than composition B.

Dyeing Results

Compositions A and B are applied to locks of natural 90% gray hair, in a proportion of 5 g of composition per gram of lock of hair. Composition A is easier to distribute uniformly along the hair.

The locks were then placed on hotplates thermostatically regulated at 27° C. After a leave-on time of 15 minutes, the locks are rinsed and dried.

The coloration of the locks of hair is evaluated in the L*a*b* system, with a MINOLTA CM2002® spectrophotometer.

In this system, L* represents the intensity; the lower the value of L*, the more intense and powerful the coloring.

TABLE 3

|  | L* |
|---|---|
| A (invention) | 31.96 |
| B (comparative) | 35.04 |

A more powerful coloring of the locks is obtained with composition A according to the invention than with composition B.

Study of the Color of the Rinsing Water (Bleeding Test) After One Shampoo Wash

Compositions A and B were applied to locks of natural gray hair in a proportion of 5 g of composition per gram of hair. At the end of a leave-on time of 15 min, the hair is rinsed and then washed with a standard shampoo. It is observed that the color of the rinsing water for the locks dyed with composition A is lighter than that of the locks dyed with composition B: there is less bleeding of the color with composition A according to the invention compared to composition B.

Example 2

Compositions A1 and B1 were prepared from ingredients of which the contents are indicated in the table below:

TABLE 4

|  | A1 (Invention) | B1 (comparative) |
|---|---|---|
| DECETH-5 | 1.8 | 1.8 |
| PROPYLENE GLYCOL | 2 | 2 |
| HEXYLENE GLYCOL | 2.5 | 2.5 |
| PEG-50 HYDROGENATED PALMAMIDE | 3 | 3 |
| GLYCERIN | 2 | 2 |
| AMINOMETHYL PROPANOL | 0.6 | 0.6 |
| SODIUM LAURETH SULFATE | 1 | 1 |
| SCLEROTIUM GUM | 1.2 | — |
| XANTHAN GUM | — | 1.2 |
| HC BLUE NO. 16 | 1 | 1 |
| water | Qs 100 | Qs 100 |

Dyeing Results

Compositions A1 and B1 are applied to locks of permanent-waved white hair, in a proportion of 5 g of composition per gram of lock of hair.

The locks were then placed on hotplates thermostatically regulated at 27° C. After a leave-on time of 15 minutes, the locks are rinsed and dried.

The coloration of the locks of hair is evaluated in the L*a*b* system, with a MINOLTA CM2002® spectrophotometer.

In this system, L* represents the intensity; the lower the value of L*, the more intense and powerful the coloring.

TABLE 3

|  | L* |
|---|---|
| A1 (invention) | 29.95 |
| B1 (comparative) | 36.77 |

A more powerful coloring of the locks is obtained with composition A1 according to the invention than with composition B1.

The invention claimed is:

1. A composition for dyeing keratin fibers, comprising:
   at least one anthraquinone cationic direct dye,
   at least one polyol,
   at least one anionic surfactant, and
   at least one nonionic polysaccharide.

2. The composition of claim 1, comprising at least one anthraquinone cationic direct dye chosen from the cationic dyes of formula (I):

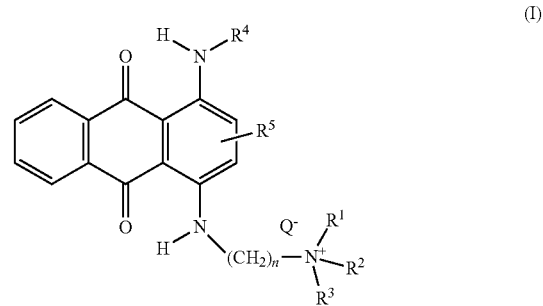

wherein:
   $R^1$, $R^2$ and $R^3$ are independently chosen from a hydrogen atom or an optionally substituted ($C_1$-$C_8$) alkyl group;
   $R^4$ represents a hydrogen atom or an optionally substituted ($C_1$-$C_8$) alkyl group;
   $R^5$ represents a hydrogen atom, an optionally substituted ($C_1$-$C_8$) alkyl group, an optionally substituted ($C_1$-$C_8$) alkylene group, a halogen, a hydroxyl group, or a ($C_1$-$C_8$) alkoxy group;
   n represents a number ranging from 1 to 8;
   Q represents an organic or mineral anionic counterion.

3. The composition of claim 1, comprising at least one anthraquinone cationic direct dye chosen from the cationic dyes of formula (I') or (I"):

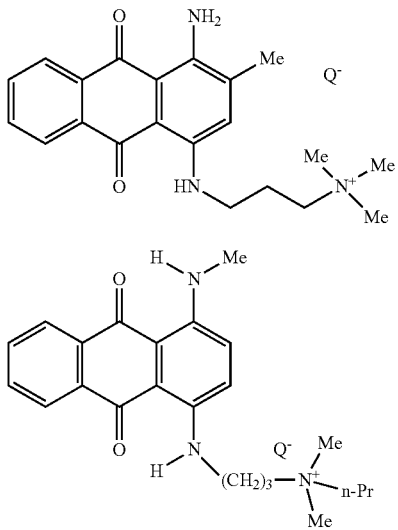

wherein Q represents an anionic counterion.

4. The composition of claim 1, comprising at least one anthraquinone cationic direct dye chosen from HC Blue 16 or HC Blue 17.

5. The composition of claim 1, wherein the total amount of anthraquinone cationic direct dyes ranges from 0.01% to 15% by weight, relative to the total weight of the composition.

6. The composition of claim 1, comprising at least one polyol comprising at least three carbon atoms.

7. The composition of claim 1, wherein the total amount of polyols ranges from 0.1% to 20% by weight, relative to the total weight of the composition.

8. The composition of claim 1, comprising at least one anionic surfactant chosen from sulfate anionic surfactants, sulfonate anionic surfactants, carboxylic anionic surfactants, or mixtures of two or more thereof.

9. The composition of claim 1, comprising at least one anionic surfactant chosen from $C_6$-$C_{30}$ fatty acids, ($C_6$-$C_{30}$) acylglycinates, ($C_6$-$C_{30}$) acyllactylates, ($C_6$-$C_{30}$) acylsarcosinates, ($C_6$-$C_{30}$) acylglutamates; alkyl-D-galactosideuronic acids, alkyl ether carboxylic acids, alkyl ($C_6$-$C_{30}$ aryl) ether carboxylic acids, alkylamido ether carboxylic acids; $C_6$-$C_{24}$ alkyl monoesters of polyglycoside-polycarboxylic acids, salts thereof, or mixtures of two or more thereof.

10. The composition of claim 1, comprising at least one anionic surfactant chosen from $C_6$-$C_{30}$ fatty acids.

11. The composition of claim 1, wherein the total amount of anionic surfactants ranges from 0.05% to 10% by weight, relative to the total weight of the composition.

12. The composition of claim 1, comprising at least one nonionic polysaccharide chosen from microbial gums.

13. The composition of claim 1, comprising at least one nonionic polysaccharide chosen from glucans, modified starches, unmodified starches, amylose, amylopectin, glycogen, dextrans, celluloses and derivatives thereof, mannans, xylans, lignins, arabans, galactans, galacturonans, chitin, chitosans, glucuronoxylans, arabinoxylans, xyloglucans, glucomannans, pectic acids and pectins, arabinogalactans, carrageenans, agars, gums arabic, gums tragacanth, ghatti gums, karaya gums, locust bean gums, galactomannans, or mixtures of two or more thereof.

14. The composition of claim 1, wherein the nonionic polysaccharides are chosen from scleroglucan gums, guar gums, celluloses, cellulose derivatives, or mixtures of two or more thereof.

15. The composition of claim 1, wherein the total amount of nonionic polysaccharides ranges from 0.1% to 10%, relative to the total weight of the composition.

16. The composition of claim 1, further comprising one or more basifying agents.

17. A method for dyeing keratin fibers, comprising applying to the keratin fibers a composition comprising:
at least one anthraquinone cationic direct dye,
at least one polyol,
at least one anionic surfactant, and
at least one nonionic polysaccharides.

18. The method of claim 17, wherein the composition comprises a total amount of anthraquinone cationic direct dyes ranging from 0.01% to 15% by weight, relative to the total weight of the composition.

19. The method of claim 17, wherein the composition comprises a total amount of polyols ranging from 0.1% to 20% by weight, relative to the total weight of the composition.

20. The method of claim 17, wherein the composition comprises a total amount of anionic surfactants ranging from 0.05% to 10% by weight, relative to the total weight of the composition.

* * * * *